G. HOEPNER.
AUTOMATIC FEED REGULATING MEANS FOR WEIGHING MACHINES.
APPLICATION FILED DEC. 21, 1918.

1,367,047.

Patented Feb. 1, 1921.

Witness:
Harry S. Gaither

Inventor:
George Hoepner
by Chamberlin & Freudenreich
Att'ys

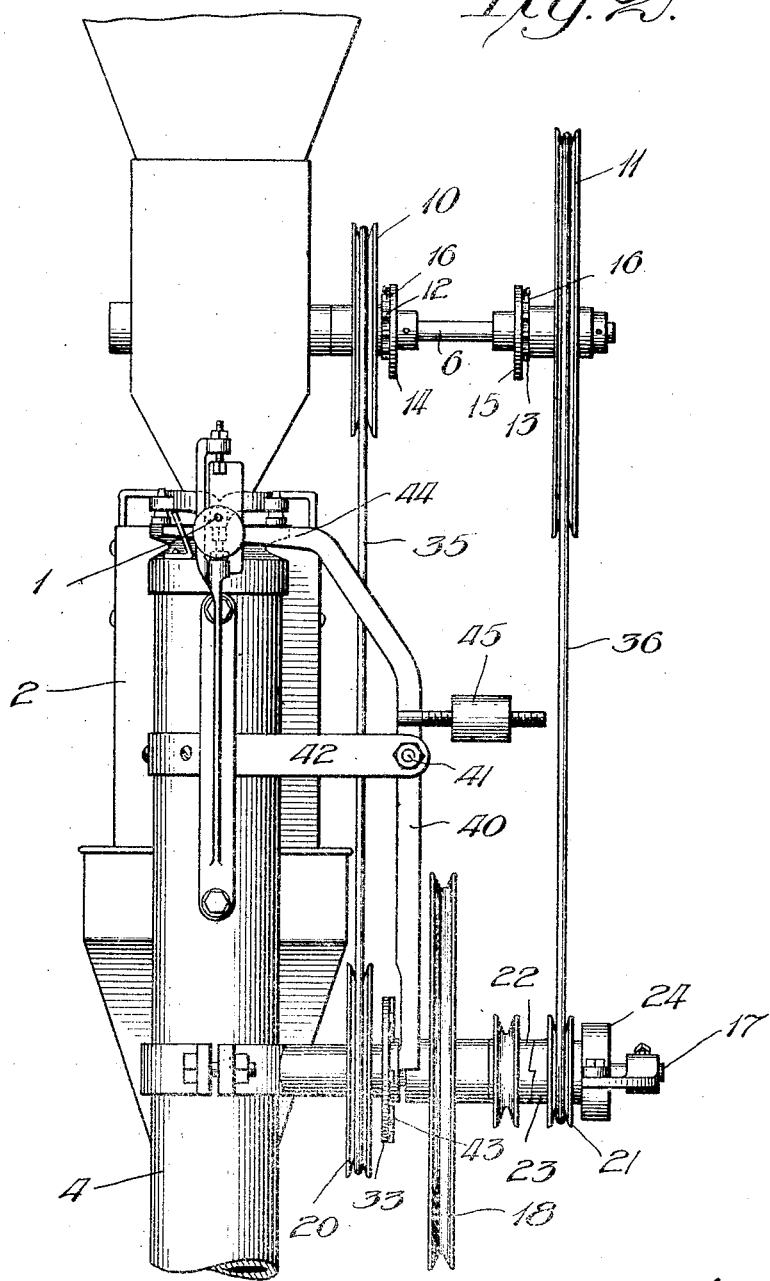

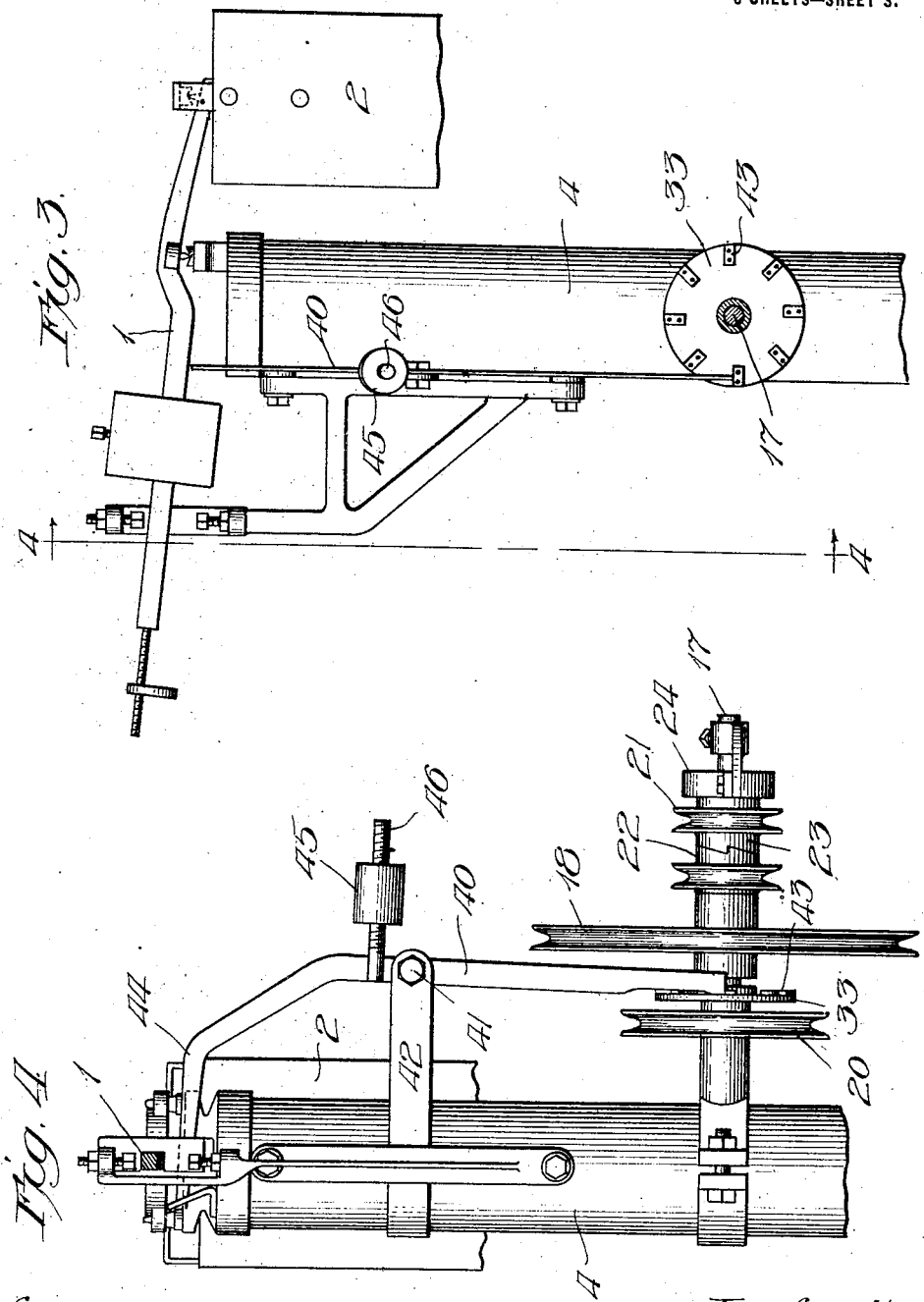

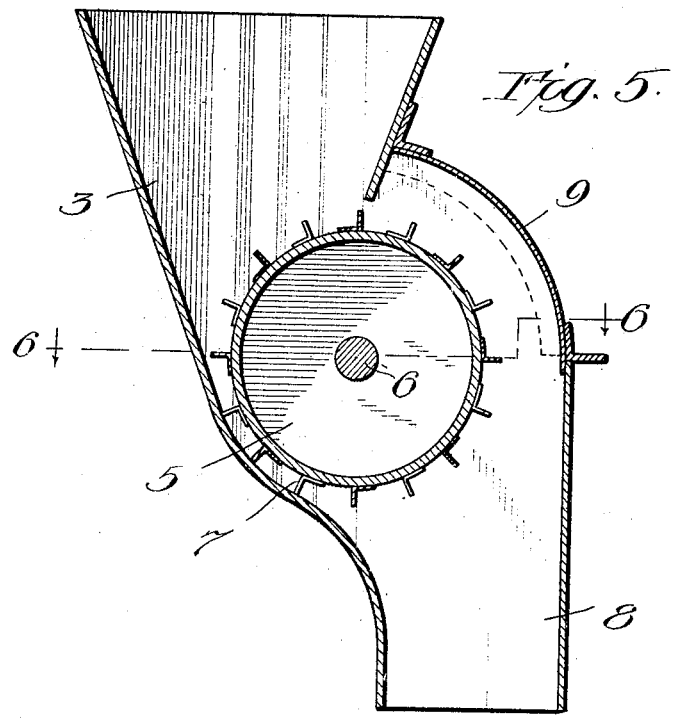
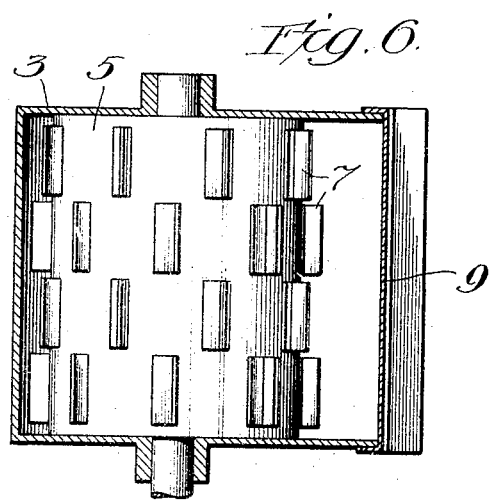

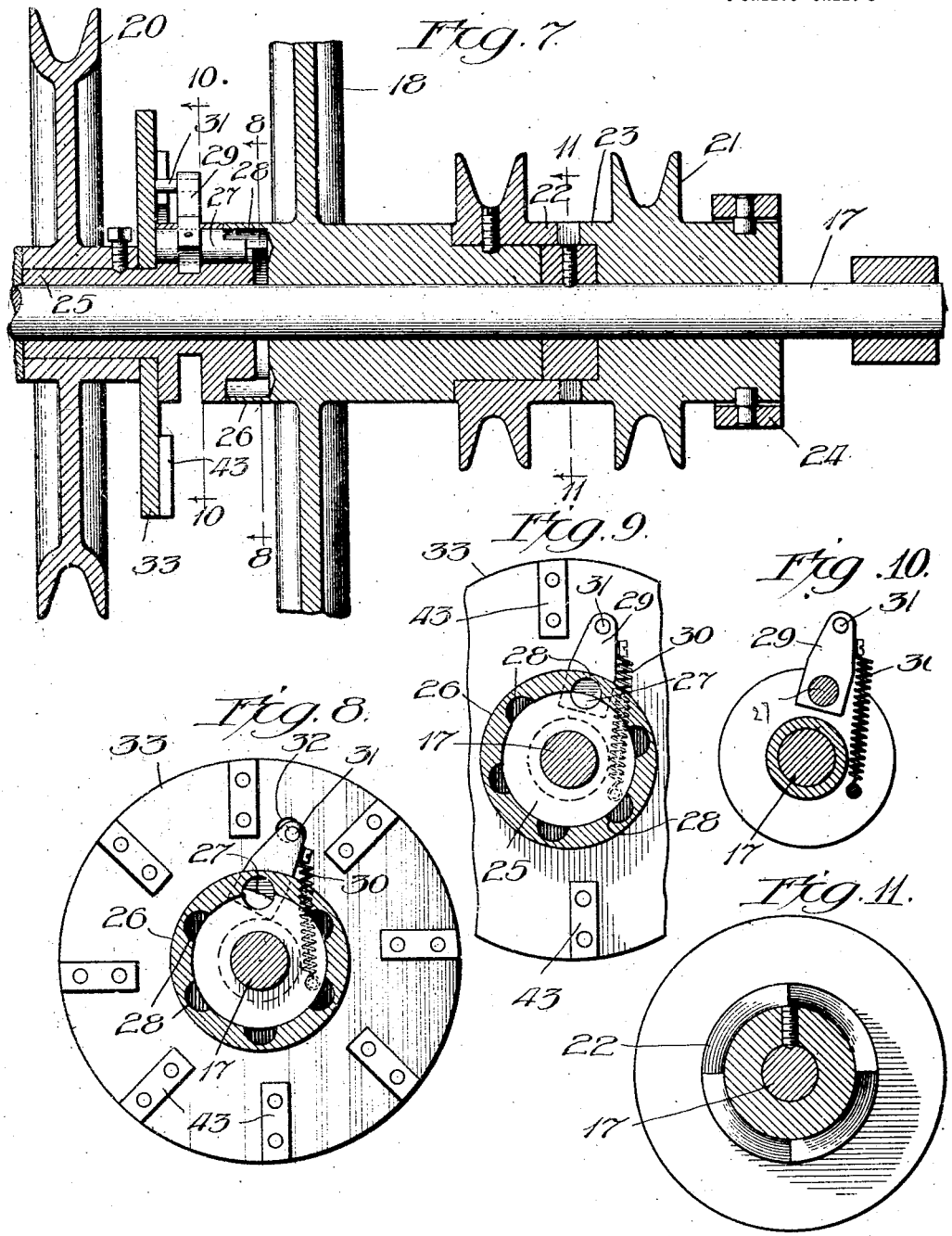

G. HOEPNER.
AUTOMATIC FEED REGULATING MEANS FOR WEIGHING MACHINES.
APPLICATION FILED DEC. 21, 1918.
1,367,047.
Patented Feb. 1, 1921.
6 SHEETS—SHEET 6.
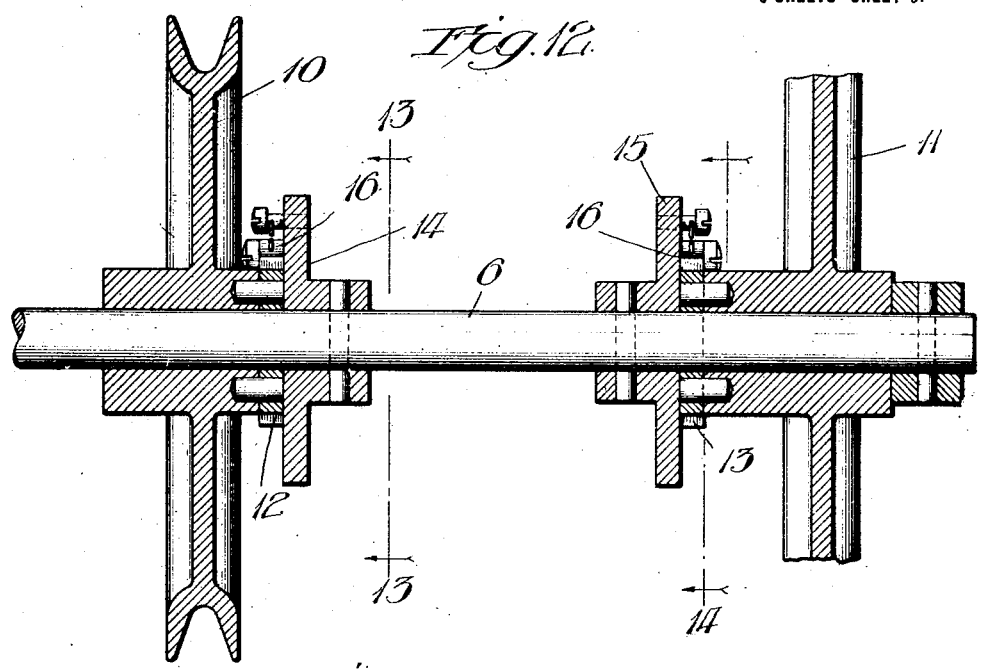
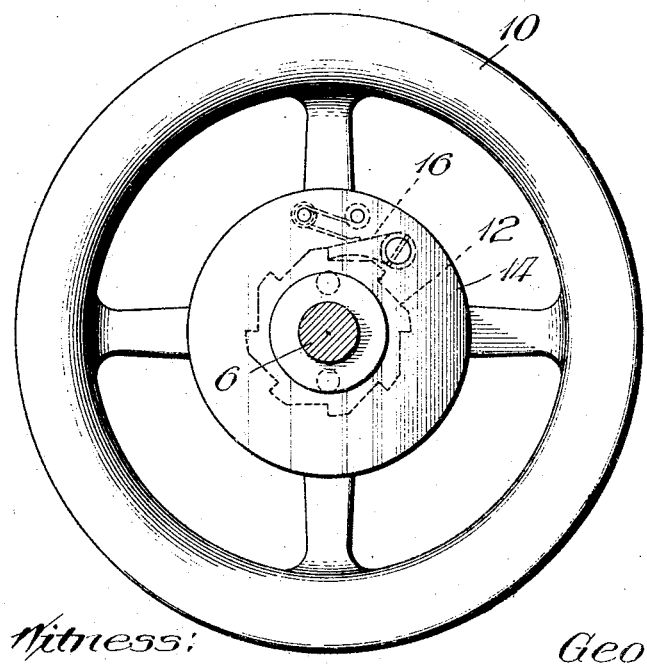
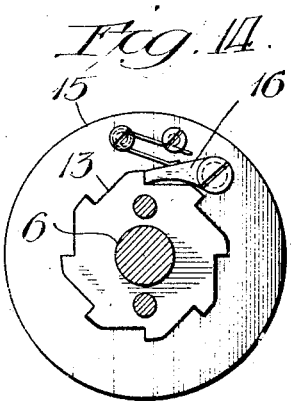
Witness:
Harry S. Gaither
Inventor:
George Hoepner
by Chamberlin Frendenreich
Attys

UNITED STATES PATENT OFFICE.

GEORGE HOEPNER, OF CHICAGO, ILLINOIS.

AUTOMATIC FEED-REGULATING MEANS FOR WEIGHING-MACHINES.

1,367,047.  Specification of Letters Patent.  Patented Feb. 1, 1921.

Application filed December 21, 1918. Serial No. 267,793.

*To all whom it may concern:*

Be it known that I, GEORGE HOEPNER, a citizen of the United States, residing at Chicago, county of Cook, State of Illinois, have invented a certain new and useful Improvement in Automatic Feed-Regulating Means for Weighing-Machines, and declare the following to be a full, clear, and exact description of the same, such as will enable others skilled in the art to which it pertains to make and use the same, reference being had to the accompanying drawings, which form a part of this specification.

The best way rapidly to separate individual quantities from material in bulk in such a manner as to secure a comparative degree of uniformity, is to permit the material to flow from the hopper or other source of supply into the bucket or pan of an automatic weighing machine in the form of a strong stream until almost the desired quantity has been delivered, and then to throttle the flow of material so as to permit the weighing machine to cut off the flow entirely when the desired quantity has been measured out.

The object of the present invention is to produce a simple and novel feeding mechanism by means of which the material may be fed positively to the weighing machine, first in the form of a main stream and then in the form of an attenuated or drip stream.

A further object of the present invention is to produce a simple and novel mechanism for feeding material to be weighed to a weighing machine in such a manner that an entire charge may be delivered in the form of a strong main stream or in the form of a main stream and an attenuated or drip stream adapted to supply any desired part of the whole charge or to be maintained for any desired length of time after the main stream.

In carrying out my invention I make use of a rotating feeding device located in the outlet end of the hopper or container from which the supply of material is drawn and provide means for automatically changing the speed of such device in order to transform a main stream into a drip stream and therefore, viewed in one of its aspects, my invention may be said to have for its object to produce a simple and novel arrangement for enabling a scale beam to vary the speed of a feeding mechanism without interfering with the operation of the beam as a weighing element.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Fig. 2 is a front view of the machine;

Fig. 3 is a view similar to Fig. 1, parts of the machine being omitted in order better to show the parts having to do particularly with the present invention, and illustrating different positions of the vertical beam and controlling lever from those occupied by these elements in Fig. 1;

Fig. 4 is a view bearing the same relation to Fig. 2 that Fig. 3 bears to Fig. 1, and it is also a section taken approximately on line 4—4 of Fig. 3;

Fig. 5 is a vertical section through the outlet end of the hopper for supplying material to the bucket or pan of the weighing machine, taken at right angles to the axis of the rotary feeding device;

Fig. 6 is a section taken approximately on line 6—6 of Fig. 5;

Fig. 7 is a section on an enlarged scale on a plane passing through the axis of the shaft of the driving portion of the two speed drive for the rotary feeding means;

Fig. 8 is a section taken approximately on line 8—8 of Fig. 7;

Fig. 9 is a view similar to Fig. 8, showing a different position of the parts;

Fig. 10 is a section taken approximately on line 10—10 of Fig. 7, showing only the elements immediately adjacent to the plane of said line;

Fig. 11 is a section taken approximately on line 11—11 of Fig. 7;

Fig. 12 is a central longitudinal section through the driven portion of the two speed driving mechanism for the feeding means;

Fig. 13 is a section taken approximately on line 13—13 of Fig. 12; and

Fig. 14 is a section take approximately on line 14—14 of Fig. 12.

Figure 1:
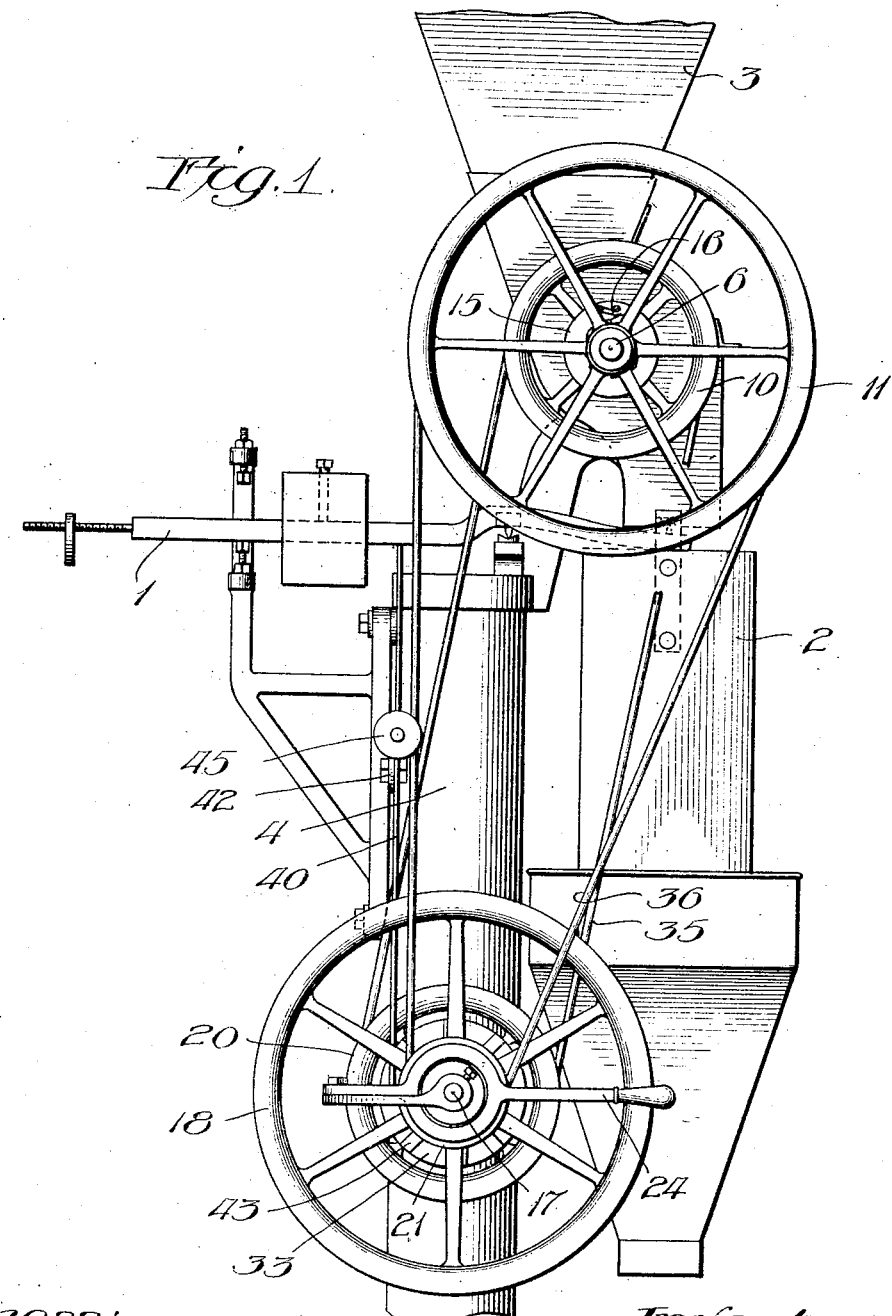
Figure 1 is a side elevation of a weighing machine arranged in accordance with a preferred form of my invention.

Referring to the drawings, 1 represents a scale beam carrying a pan or bucket, 2, into which the material to be weighed is fed from a suitable hopper, 3. The scale beam and the hopper are supported in any suitable way as, for example, by a suitable standard or column, 4. In the outlet end of the hopper, as best shown in Figs. 5 and 6, is a drum, 5, fixed upon a transverse rotatable shaft, 6; the drum being of the same length as the length of the hopper outlet and being of a diameter somewhat less than the width of the outlet. On the periphery of the drum are numerous projections, 7, which may conveniently take the form of short vanes distributed over the periphery of the drum. It will be seen that when the hopper is filled with material to be weighed and the drum set in rotation it will positively remove quantities from the bottom of the mass and discharge them. The lower end of the hopper is preferably continued past the drum so as to form a chute, 8, down which the material may flow to the bucket. A doorway may be left in the chute in front of and somewhat above the drum in position to be closed by a detachable door, 9, if desired, so as to permit the drum to be inspected.

The shaft 6 extends outwardly at one end and has mounted thereon two loose wheels, 10 and 11. Fixed to each of these wheels is a ratchet wheel, indicated at 12 and 13, respectively. Fixed to the shaft, as best seen in Figs. 2, 12, 13 and 14, beside the two ratchet wheels are disks, 14 and 15, each of which carries a pawl, 16, coöperating with the corresponding ratchet wheel. It will be seen that when either of the wheels or pulleys 10 and 11 is driven in the clockwise direction, as viewed in Fig. 13, the shaft must rotate with it, and that either the driving wheels or pulleys may remain stationary or be traveling slower than the other because the more rapidly moving member will carry the shaft with it without interference on the part of the more slowly moving or stationary member.

Below and parallel with the shaft 6 is a shaft, 17, on which is loosely mounted a main driving pulley or wheel, 18. Loose on the shaft 17 are two driving wheels or pulleys, 20 and 21, arranged below the pulleys 10 and 11, respectively. The details of this mechanism are best shown in Figs. 7 to 11. For convenience the pulley, 21, is made separate from the main driving pulley so that the pulley 21 may be clutched to and unclutched from the main driving pulley, at will. In the arrangement shown, there is a part, 22, fixed to the pulley, 18, and a part, 23, on the pulley, 21, forming the elements of a toothed clutch. The pulley 21 has a limited movement lengthwise of the shaft 17 and, by means of a suitable shifting lever, 24, it may be moved from the position shown in Fig. 7, in which it is clutched to the driving pulley, into a position such that the two complementary members of the clutch are out of engagement with each other. The connection between the pulleys 18 and 20 is as follows: The pulley 20 is fixed on a sleeve, 25, which projects into a tubular hub, 26, on the member 18. A cylindrical dog, 27, is mounted on the sleeve 25 with its axis lying parallel to the axis of the shaft 17. In the interior of the tubular hub, 26, are distributed a series of longitudinal grooves, 28. One side of the cylindrical dog is cut away throughout that portion which projects into the tubular hub and the parts are so proportioned that whenever the dog is brought opposite one of the recesses or grooves, 28, it may be rotated so as to permit the remaining part of the mutilated end to enter the groove or recess and thus lock the sleeve and the hub, and therefore the pulley 20 and the pulley 18, together. This latter condition is the one illustrated in Fig. 8. When it is desired to uncouple the two pulleys from each other, the dog is turned into the position shown in Fig. 9, the mutilated end permitting the sleeve and the tubular hub to turn independently of each other. Fixed to the dog 27 is a radially-projecting arm, 29, between which and the sleeve 25 is arranged a spring, 30, tending constantly to turn the dog into its locking or clutching position. The arm, 29, has a pin or finger, 31, extending laterally from its outer end into an opening, 32, in a disk, 33, which is loose on the sleeve 25 so as to be capable of turning thereon. Normally, the spring 30 will act to overcome the inertia of the disk 33 and will bring the dog into its locking position as illustrated in Fig. 8 whenever the dog happens to come opposite one of the grooves or recesses. When it is desired to unclutch the pulley 20, this may be accomplished by applying a brake or otherwise arresting the disk 33 so that, as the pin 27 is carried forward while the upper end of the controlling arm 29 is stationary, the pin will be rotated sufficiently to effect its release from the particular groove or recess, 28, in which it may have been lying.

The pulleys 10 and 20 are connected by a belt, 35, and the pulleys 11 and 21 are connected by a suitable belt, 36. The pulleys are so proportioned that for a given speed of the driving pulley 18, the shaft 6 will be driven much more rapidly when it is being driven through the pulley 10 than when it is being driven through the pulley 11. Consequently, when both of the pulleys 20 and 21 are clutched to the pulley 18, so that both of the pulleys 10 and 11 are being driven, the shaft 6 will be driven by the pulley 10 while the pawl associated with the pulley 11 will be riding idly over its ratchet wheel. The feed from the hopper will now be rapid because the feeding drum is being rapidly rotated. In order to reduce the size of the stream which is being delivered by the feeding drum, it is sufficient to reduce the speed of rotation of the shaft 6 and this can be accomplished by simply unclutching the pulley 20 from the main pulley 18 in the manner heretofore explained, so that the pulley 10 becomes stationary and the shaft 6 is driven through the low speed drive consisting of the pulleys 11 and 21 and the belt 36.

The controlling disk, 33, for the high speed drive is in turn controlled by the scale beam. To this end I have mounted on a stationary part of the machine a controlling lever, 40, which, in the arrangement shown, takes the form of a vertical lever pivoted between its ends, as indicated at 41, to a bracket, 42, carried by the standard or column 4; the pivotal axis of the lever being at right angles to the axis of the shaft 17. The lower end of the lever 40 extends down beside the disk 33 which is provided with a series of lateral projections or teeth, 43, the nearest of which is adapted to strike against the extreme lower end of the lever when the latter is swung inwardly toward the disk. As soon as one of the teeth or projections strikes the lower end of the lever, the latter acts as a fixed abutment which causes the disk to come to rest and therefore the high speed drive to be thrown out of action. The upper end of the lever 40 is provided with a laterally-projecting arm, 44, which underlies the scale beam at such a point that any upward thrust thereon acts in the same manner as an addition to the load in the weighing bucket. A suitable adjustable counterweight, 45, is carried by the controlling lever at such a point that it tends constantly to swing the lower end of the lever laterally into contact with the controlling disk and to cause the arm on the upper end of the lever to overbalance the scale beam. The parts are so proportioned that when the scale beam is down, that is when the bucket is empty, the beam will rest on the arm of the controlling lever and hold the lever away from the disk 33 against the resistance of the counterweight. Consequently, when the machine is set in operation, the feed drum will initially be driven by the high speed mechanism because of the fact that the driving pulley 20 is coupled to the main pulley 18; the parts being now in the condition shown in Fig. 2. The counterweight on the controlling lever, however, is constantly tending to tilt the scale beam, adding its efforts to those of the material entering the weighing bucket and therefore a point will be reached, before the complete charge has been delivered to the bucket, when the combined effect of the material in the bucket and the counterweight will serve to tilt the beam. When this latter condition has been brought about, the lower end of the controlling lever will be swung into contact with the controlling disk 33 and, as soon as the nearest pin or projection on the disk strikes the end of the lever, the high speed driving mechanism will be rendered idle and the feed drum will be operated by means of the low speed drive. In other words, the main strong stream will be throttled down into an attenuated drip stream. The engagement of the lower end of the controlling lever with the side of the controlling disk serves also the purpose of arresting the upward movement of the arm at the upper end of the controlling lever, so that the scale beam is no longer influenced by the controlling lever but continues the final part of its weighing operation, while the drip stream is completing the desired charge, just as though the controlling lever were not present.

The counterweight is preferably made adjustable. In the arrangement shown, it consists of an ordinary weight-screw threaded upon a rod, 46, projecting laterally from the controlling lever. It will be seen that by having an adjustable counterweight, the point at which the combined action of the counterweight and of the contents of the bucket will start the tilting of the scale beam and thus bring into existence a drip stream, may be varied within wide limits. In other words, the drip stream may be allowed to flow for such length of time as will be most suitable under the particular conditions encountered at any given time; such conditions following with the kind and quality of material which is being weighed and with the degree of accuracy in weighing that is desired.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. The combination with a weighing machine having a scale beam, of a device for feeding material thereto, mechanism for actuating said device at a plurality of speeds, and means disconnected from but acting on the scale beam for controlling said mechanism.

2. In a weighing machine, a scale beam, and means for applying to the scale beam a force adapted to assist a load which is being weighed in tipping the beam and discontinuing said force after the beam has been tipped through a predetermined angle less than the angle through which the beam swings in passing from an idle position to a poising position.

3. In a weighing machine, a scale, means for applying to the scale beam a force adapted to assist a load which is being weighed in tipping the beam and discontinuing said force after the beam has been tipped through a predetermined angle, a device for feeding material to the weighing machine, mechanism for actuating said device at a plurality of speeds, and parts set in motion by the aforesaid means for controlling said mechanism so as to produce a change of speed when said beam has been moved through said predetermined angle.

4. The combination with a weighing machine having a vertical beam, of mechanism for delivering material thereto alternately in the form of a main stream and a drip stream, a member having a part disconnected from but acting on the scale beam in a direction to assist a load which is being weighed in tipping the beam through a predetermined fraction of the swinging movement of the beam from an idle position to a poising position, and means controlled by the member for causing said mechanism to change the delivery of the material from the main stream to a drip stream when the beam has been tipped through said predetermined angle.

5. The combination with a weighing machine having a scale beam, of a device for feeding material thereto, a two speed actuating mechanism for said device, a member having a part disconnected from but acting on the scale beam to assist the load in swinging the beam through a predetermined fraction of its movement from an idle position to a poising position, and means governed by the said member for controlling said mechanism, adjustable so as to cause said device to be actuated at the high speed during any desired predetermined part of the operation of weighing an individual charge and at the low speed during the remainder of such operation.

6. The combination with a weighing machine having a scale beam, of mechanism for delivering material thereto alternately in the form of a main stream and a drip stream, a controlling lever for said mechanism having a part disconnected from but acting on the scale beam in a direction to assist a load which is being weighed in tipping the beam, and means for varying the pressure exerted by said controlling lever on the scale beam when the weighing machine is empty.

7. The combination with a weighing machine, of mechanism for alternately feeding material thereto in the form of a main stream and a drip stream, and a controller for said mechanism comprising a lever extending at one end underneath the scale beam and pivotally supported and controlled so as to be limited to a swinging movement in one direction less than that required to keep it in contact with the scale beam when the latter is completely overbalanced by a load which is being weighed.

8. The combination with a weighing machine, of mechanism for alternately feeding material thereto in the form of a main stream and a drip stream, a controller for said mechanism comprising a lever extending at one end underneath the scale beam and pivotally supported and controlled so as to be limited to a swinging movement in one direction less than that required to keep it in contact with the scale beam when the latter is completely overbalanced by a load which is being weighed, and an adjustable weight associated with said lever adapted to permit a variation in the upward pressure of the lever on the scale beam when the latter is down.

9. The combination with a weighing machine, of a device for feeding material thereto, a shaft connected to said device, two wheels loose on said shaft, a pawl and ratchet means between each wheel and the aforesaid shaft to produce a driving connection between the wheels and the shaft for rotation in one direction only, a driving member, two driving wheels each operatively connected to one of the aforesaid wheels and forming with the latter a two speed drive, a connection between said driving member and one of said driving wheels, and a clutch controlled by said weighing machine for connecting the other driving wheel with said driving member.

10. The combination with the scale beam of a weighing machine, of means for applying thereto during only a fraction of its swinging movement from an idle position to a poising position a force acting in a direction to assist a load which is being weighed in tipping the beam.

11. The combination with the scale beam of a weighing machine, of means for applying thereto during only a fraction of its swinging movement from an idle position to a poising position a variable force acting in a direction to assist a load which is being weighed in tipping the beam.

12. The combination with a weighing machine having a scale beam, of a device for feeding material thereto, mechanism for actuating said device at a plurality of speeds, a counter-weighted controlling lever for said mechanism, said lever being so positioned relatively to the scale beam that the scale beam serves to hold the lever at one limit of its movement when the weighing machine is empty and the lever serves as an agent adapted to assist a load which is being weighed in tipping the beam, and a stop for said lever to hold the lever out of engagement with the scale beam when the latter has been tipped through a predetermined angle by the combined action of the lever and the load.

13. The combination with a weighing machine having a scale beam, a device for feeding material thereto, mechanism for actuating said device at a plurality of speeds, a counter-weighted trip for said mechanism tending normally to move into a position to produce a shift from a higher speed to a lower speed, said trip having a part adapted to be engaged by the scale beam when the weighing machine is empty and hold the trip against following the aforesaid tendency.

In testimony whereof, I sign this specification.

GEORGE HOEPNER.